3,429,528
FLIGHT CONTROL FOR VERTICAL
TAKE-OFF AIRCRAFT
Cadwallader W. Kelsey, Guilford, Conn., assignor to
Skycar, Inc., New Haven, Conn., a corporation of
Connecticut
Filed May 25, 1967, Ser. No. 641,229
U.S. Cl. 244—12                                     8 Claims
Int. Cl. B64c 29/00, 17/02

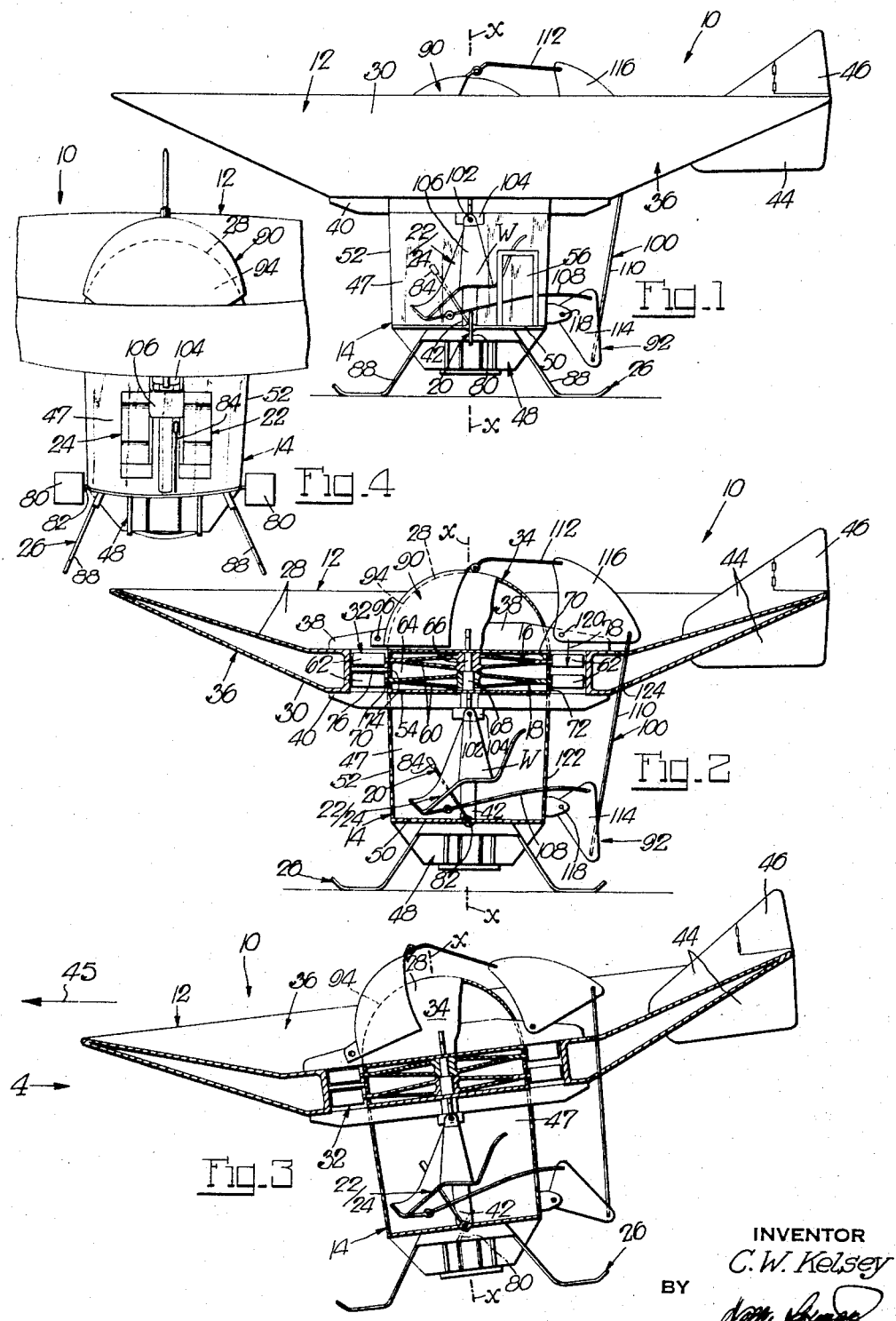

ABSTRACT OF THE DISCLOSURE

The disclosure deals with an aircraft having a disc-like top wing and therefrom suspended central fuselage about a vertical axis, air impellers power-driven about this axis, and a flap-type control for vertical take-off of the craft and for tilting it for forward flight. Featured in the craft is a pivoted hood on the wing which in vertical disposition of the craft is in substantial form-fit with part of the upper wing surface, but on tilting the craft for forward flight is swung away from the wing surface to act as an air brake in preventing dangerous tilting of the craft, with the hood being thus swung by an operating connection with a pendulum-like weight in the also featured form of the top-pivoted pilot's seat in the fuselage.

The present invention is concerned with the type of aircraft shown in my copending application Ser. No. 532,681, filed Mar. 8, 1966, which features a disc-like top wing with a concentric through-passage that divides the wing into inner and outer sections and in which the active blades of counter-driven air impellers operate, and a fuselage immediately beneath the inner wing section so that only the upper surface thereof is a lift surface. In operation of the impellers, air is drawn from above the wing over the top surface thereof into the through-passage and is expelled therefrom downwardly, with ensuing vacuum-lift effect on the upper wing surface and also up-thrust effect of the air on the spinning impeller blades.

It is among the objects of the present invention to provide an aircraft of this type with an automatic control which responds to forward tilting at a safe limit of the craft in forward flight under manual control of the pilot to hold the craft at the safe tilt limit even if the pilot should by manual control accidentally or deliberately attempt to force the craft beyond this safe tilt limit. Automatic control in this fashion over the permissible limit of forward tilt of the craft and, hence, also its maximum forward speed, is a factor which significantly contributes to safe operation of the craft at no more skill of the pilot than is required for safe operation of an automobile, and even renders the craft non-responsive to a pilot's accidental or reckless control attempts to force the craft into still greater forward speed at a dangerous forward tilt of the same.

It is another object of the present invention to provide an aircraft of this type with the aforementioned automatic control in the form of a baffle which in vertical disposition of the craft, as on vertical take-off, for instance, is part of the wing within its aerodynamic section, but on tilting of the craft for forward flight is moved out of the wing section and into the passing air current to react therewith in countering forward tilt of the craft under the pilot's control which may be by way of a simple and preferred flap in the downstreaming air from the through-passage or duct in the wing. There is also provided an operating mechanism for the baffle whereby the latter is moved increasingly from the wing section with increasing forward tilt of the craft, so that the craft will respond to the pilot's control for forward tilt over the permission range but at increasing counter-tilt effect from the baffle until at the end of this range the tilt response of the craft to the pilot's control is at a maximum.

It is a further object of the present invention to provide an aircraft of this type in which the upper surface of the inner wing section is advantageously dome-shaped for good lift effect as well as for least turbulence of the impeller-drawn air on its way into the wing duct, and the aforementioned baffle is in the form of a hood separate from the wing and of partial dome shape so as to be in vertical disposition of the craft superposed on and in form-fit with a part of the upper wing surface facing in forward flight direction of the craft, with this hood being pivoted to the inner wing section near the wing passage so as to be tiltable to and from the inner wing section by its aforementioned operating mechanism. In thus arranging the hood, the same blends with the inner wing section in vertical disposition of the craft and, hence, interferes in no wise with the lift performance of the craft, and the hood is in its performance away from the inner wing section an adequate air barrier to have the required counter-tilt effect on the craft, yet is in its partial dome shape sufficiently streamlined to divert the passing air so that it has for all practical intents and purposes no lift-diminishing turbulence on the upper wing surfaces.

Another object of the present invention is to provide an aircraft of this type in which the operating mechanism for the aforementioned pivoted hood on the inner wing section is in the form of a pendulous weight and an operating linkage between the latter and the hood, with gravity keeping the pendulous weight in vertical suspension at all times and the operating linkage being arranged so that on operational tilting of the craft relative to the pendulous weight the hood will respond in the required manner. In order to keep the pendulous weight in vertical suspension at all times, the same and the hood and operating linkage between them are coordinated accordingly so that lift and counter-tilt forces on the hood in flight of the craft will be ineffective to force the pendulum from its vertical suspension. With this arrangement, the required operation of the hood, by being responsive to gravity, is particularly reliable and entirely foolproof, wherefore the craft is equally reliable and foolproof in its safe flight at any maneuver.

It is another object of the present invention to provide an aircraft of this type in which the aforementioned pendulous weight for operation of the hood is advantageously a component of the craft which already performs another and imperative function for flight of the craft, by pivotally suspending such component to thereby perform the additional function of the pendulous weight. With this arrangement, the permissible utility load for the craft is only inappreciably less than that if the craft were devoid of the automatic control, especially since the only special weight of the automatic control is that of the hood and linkage connection and their weight can be kept very light.

Another object of the present invention is to provide an aircraft of this type in which the pilot's seat and any passenger seat or seats are advantageously pivotally suspended overhead in the cabin space, whereby these seats will in flight of the craft automatically be disposed mostly as though resting on a horizontal floor. This is of particular advantage in this type of aircraft which may take-off, land or hover vertically and in forward flight is in different tilted dispositions, yet the pilot and passenger or passengers will in each event have that optimum rest comfort on their seats for which the latter were designed on a horizontal support. The seat arrangement in this fashion will also relieve particularly a passenger or passengers of the starling sensation, alarming to some, of his or her seat tipping with the craft.

It is a further object of the present invention to provide an aircraft of this type in which the aforementioned component of the craft with the additional pendulous-weight function is advantageously the aforementioned pivotally overhead suspended pilot's seat and preferably also passenger seat or seats. With this arrangement, the live load in addition to that of the suspended seats is used advantageously for control of the hood in flight of the craft, with the weight of the pilot alone of the live load in the absence of a passenger or passengers being more than adequate for proper control of the hood, and the thus occupied seat or seats in flight of the craft affording ample assurance that nobody will tamper with this effective automatic control of the hood.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a side view of a grounded aircraft embodying the present invention;

FIG. 2 is a cross-section through the same aircraft;

FIG. 3 is a section through the aircraft similar to FIG. 2, but showing the craft in exemplary forward flight; and FIG. 4 is a fragmentary front view of the aircraft in flight as seen in the direction of arrow 4 in FIG. 3.

Referring to the drawings, and more particularly to FIGS. 1 and 2 thereof, the reference numeral 10 designates an aircraft of vertical take-off type which has as its major components a top wing 12, a fuselage 14, air impellers 16 and 18 driven from a power plant over a transmission (neither shown), a manual flight control 20, pilot and passenger seats 22 and 24 in the fuselage 14, and a landing gear 26.

The wing 12, which is substantially disc-shaped about the major vertical axis $x$ of the craft, has top and bottom surfaces 28 and 30 and is provided with a concentric ring-shaped through-duct 32 that divides the wing into inner and outer sections 34 and 36. These wing sections 34 and 36 are formed separately, and they are suitably anchored to a plurality of cross-braces 38, 40 which span the wing duct 32 at both ends (FIG. 2), with the lower braces 40 being mounted at the top end of a hollow center column 42, and the top braces 38 being by their anchor connections with the inner and outer wing sections 34 and 36 secured to the lower bracecs 40. Suspended from the upper cross braces 38 is another center column (not shown) which extends downwardly through the other center column 42 and is the major mounting column for most of the craft beneath the wing. The wing 12 is also provided with a fin 44 that determines the forward flight direction of the craft as represented by the arrow 45 in FIG. 3, and is further provided with a rudder 46 for side-maneuvering the craft, with this rudder being in any conventional manner manipulated by the pilot in the cabin space 47 in the fuselage 14.

The fuselage 14 is in this instance a cylindrical body with a bottom structure 48 including a floor 50, and a cylindrical enclosure 52, of which the bottom structure 48 is suitably mounted on the aforementioned major mounting column of the craft, and the enclosure 52 is at its top and bottom suitably anchored to the bottom wall 54 of the inner wing section 34 and to the floor 50, respectively. The enclosure 52, floor 50 and top wall 54 together define the cabin space 47. The enclosure 52 is preferably of strong transparent plastic, and is provided with a door 56 through which to enter and leave the cabin space 47.

The impellers 16 and 18 each have a spinner member or disc 60 and air impeller blades 62 on the outer periphery. The impeller discs 60, which are located in an annular chamber 64 in the inner wing section 34, are mounted on hollow drive shafts 66 and 68, respectively, which are telescoped and suitably journalled and extend downwardly through the center column 42 to a transmission (not shown) for their drive in opposite directions, with the transmission being connectible with a power unit, such as a turbine engine (not shown) that may be carried by the bottom structure 48 of the fuselage 14. The drive shafts 66 and 68 are coaxial with the craft axis $x$, and the aforementioned major mounting column of the craft extends through the innermost drive shaft 66. The outer peripheries of the impeller discs 60 extend outwardly from the chamber 64 through annular openings 70 in the cylindrical wall 72 thereof, and the active blades 62 on the respective discs 66 are located and operate in the wing duct 32. The chamber 64, in which the impeller discs 60 are located, is closed except for the annular openings 70, and this chamber is formed by walls of, and partitions in, the inner wing section 34, except for the cylindrical wall part 74 which is flanked by both openings 70. This latter wall part 74 is held in place by crossbraces 76 from the outer wing section 36 (FIG. 2).

The impeller blades 62 on the respective discs 60 are inclined to the craft axis $x$ and to each other so that on the power drive of these discs in correct opposite directions the blades on the upper disc will draw air through the top end of the wing duct 32 and thrust it downwardly in the general direction of the arrow 78 (FIG. 2), and the blades of the lower disc continue the downthrust of this air. Thus, on power operation of the impellers 16 and 18, air is drawn over the entire top surface of the wing with ensuing vacuum lift effect of this air on the wing. Further, with the wing duct 32 being rather constricted widthwise and the impellers 16, 18 being driven at high speed, the downward displacement of air through the wing duct 32 is at a large volumetric flow rate which makes for powerful up-thrust reaction of the air with the spinning impeller blades. The overall lift component on the craft is thus the sum of the lift components on the wing and impellers, and is accordingly high.

The manual control 20 for vertical or forward flight of the craft comprises in this instance flaps 80 which are located on opposite sides of the fuselage 14 in the path of the down-stream air from the wing duct 32, and these flaps are carried by a suitably journalled shaft 82 which extends normal to the forward flight direction of the craft. Operatively connected with this shaft 82 is a stick 84 within reach of the pilot in the cabin space 47. Thus, with the pilot holding the stick 84 so that the flaps 80 extend vertically (FIG. 1), the craft is controlled for vertical flight. However, when the pilot manipulates the stick 84 to bring the flaps 80 into an angular disposition like or similar to that shown in dot-and-dash lines in FIG. 3, the downstream air from the wing duct 32 will react with these flaps in tilting the craft with its axis $x$ out of vertical disposition into a disposition like or similar to that in FIG. 3, with ensuing forward flight of the craft owing to a then existing forward-flight component of the overall aerodynamic forces on the craft.

The pilot and passenger seats 22, 24 are provided in the cabin space 47, with the pilot on his seat 22 being within ready reach of the control stick 84 and also other manual controls (not shown). The specific mounting of these seats 22, 24 is one of the features of the present invention and will be described hereinafter. The landing gear 26 is carried by the bottom structure 48 of the fuselage, and is in the exemplary form of skids 88. The craft described so far may in most respects be like or similar to that disclosed in my aforementioned copending application Ser. No. 532,581, and forms no part of the present invention except insofar as it enters in combination therewith.

In accordance with an important aspect of the present invention, the aircraft is provided with an automatic control over the tilt of the craft in forward flight. This automatic control comprises an air baffle 90, and operating mechanism 92 therefor which on increasing manually-controlled top-forward tilt of the craft for forward flight is moved to act as an increasing barrier for the passing air and produce a couple of the craft which has an increasing tendency to tilt the latter counter to its top-forward tilt. Thus, while the craft responds only to the manual control 20 in top-forward tilting and, hence, forward flight, the tilt and counter-tilt effects on the craft from the respective manual and automatic controls are in substantial equilibrium at any selected forward tilt of the craft, with the preferred coordination between the manual and automatic controls being such that the manual control fails to respond to the pilot's attempt to force the craft beyond a safe maximum top-forward tilt. To the latter end, stick 84 for the flaps 80 of the manual control 20 may have a swing range limited by suitable fixed stops (not shown), or the effective area of the flaps may be selected to come to a position for maximum top-forward tilt of the craft without any limitation on the swing range of the stick 84.

The air baffle 90 is in this instance carried by the inner wing section 34, and is preferably contiguous with the top surface 28 of this wing section when the craft is on the ground or in vertical flight (FIGS. 1 and 2). For least turbulence of the impeller-drawn air over the wing and into the duct 32 therein and, hence, good lift effect on this air on the wing, as well as for another reason described hereinafter and effecting the air baffle 90, the top surface 28 of the inner wing section 34 is preferably dome-shaped, and more particularly substantially semi-spherical. In keeping with the preferred arrangement to have the air baffle 90 contiguous with the adjacent wing surface when the craft is on the ground or in vertical flight, this baffle 90 is in the form of a hood of part-spherical shape which on the grounded or vertically flying craft is superposed on and in substantial form-fit with a top surface part 94 of the inner wing section that faces in the forward flight direction of the craft (arrow 45 in FIG. 3). This hood 90 is at 96 pivotally mounted on the inner wing section 34, and in this instance on one of the top braces 38, preferably near the air inlet end of the wing duct 32, for swinging motion to and from the inner wing section (FIGS. 2 and 3) about an axis normal to the forward flight direction of the craft, with the hood 90 being by its operating mechanism 92 swung increasingly anticlockwise (FIG. 3) on increasing top-forward tilt of the craft in forward flight. With this arrangement, the hood 90 blends with the inner wing section in vertical disposition of the craft and, hence, interferes in no wise with the lift performance of the craft (FIGS. 1 and 2), and the hood is in its performance away from the inner wing section, as in FIGS. 3 and 4 for example, an adequate air barrier to have the required counter-tilt effect on the craft, yet is in its partial dome shape sufficiently streamlined to divert the passing air so that the same has for all practical intents and purposes no lift-diminishing turbulence on the upper wing surfaces.

The operating mechanism 92 for the hood 90 is in the preferred form of a pendulous weight W in the craft and a connecting linkage 100 between this weight W and the hood 90, with gravity keeping the weight W in vertical suspension at all times, and the operating linkage 100 being arranged so that on operational top-forward tilting of the craft relative to the pendulous weight the hood will respond in the described manner. The pendulous weight W is preferably and advantageously in the form of the seats 22 and 24 in the cabin space 47, and these seats are to this end pivoted overhead at 102 to a fixed collar 104 on the outer center column 42 for swinging movement about an axis parallel to the pivot axis of the hood 90 and, hence, normal to the forward flight direction of the craft. The seats 22, 24 are in this instance formed in a single unit and have a common hanger 106 by which they are pivotally suspended from the collar 104 (see also FIG. 4).

The linkage 100 comprises in this instance separate links 108, 110 and 112 and two rocker arms 114 and 116, of which the rocker arms 114 and 116 are at 118 and 120 pivoted to the enclosure 52 of the cabin space 47 and to one of the top braces 38, respectively, while the link 108 connects the seats 22, 24 with the arm 114, link 110 connects the arms 114 and 116, and link 112 connects the arm 116 with the hood 90, as shown in FIG. 2, for example, with the links 108 and 100 passing through narrow slits 122 and 124 in the cabin enclosure 52 and in the outer wing section 36, respectively, in which they have operating freedom. In order to keep the pendulous weight of the seats 22, 24 in vertical suspension in grounded and all flight conditions of the craft, the same and the connecting linkage 100 are coordinated accordingly, so that lift forces on the hood in vertical flight of the craft (FIG. 2) and counter-tilt forces on the hood in forward flight of the craft (FIG. 3) will be ineffective to force the seats 22, 24 from their vertical suspension. In this connection, the arrangement is preferably such that these lift and counter-tilt forces on the hood 90 are wholly inadequate to force the seats 22, 24 from their vertical suspension even if only the pilot's seat 22 is occupied.

It thus follows from the preceding that in grounded, vertical-flight and hovering condition of the aircraft the hood 90 is by the seats 22, 24 and human load thereon, even if only a pilot, held contiguous with the inner wing section 34, and is moved away from the latter into counter-tilt positions only when the craft is by the manual control 20 forced into top-forward tilted dispositions for forward flight at different speeds, with the seats 22, 24 being in vertical suspension in all counter-tilt positions of the hood 90, and the tilt and counter-tilt effects on the craft from the manual and automatic controls being substantially balanced throughout the permissable top-forward tilt range of the craft.

While in the described exemplary aircraft the coordination of the manual and automatic tilt controls of the aircraft is preferably such that at a set maximum top-forward tilt of the craft the manual control becomes ineffective in forcing the craft beyond this maximum tilt, it is, of course, fully within the ambit of the present invention to coordinate these controls so that the manual control has no limits imposed on its effective top-forward tilt of the craft and the automatic control will in the described manner counter the top-forward tilt effect of the manual control on the craft, in which case the pilot is given sole control over the forward-flight tilt, and, hence, speed of the craft. The use of the seats 22, 24 as the pendulous weight of the automatic control is particularly advantageous in that it in itself does not at all reduce the permissible utility load for the aircraft, and this permissible utility load is only inappreciably less than that if the craft were devoid of the automatic control, especially since the only special weight of this control is that of the hood and linkage connection and their weight can be kept very light. Of course, while the use of the seats as the pendulous weight of the automatic control is advantageous for this reason, it is fully within the purview of the present invention to use for this control a different pendulous weight in or on the craft which has no other function. Also, pivotal overhead suspension of the seats is in itself a feature of the present invention even if the craft did not have the automatic tilt control. Thus, the overhead pivoted seats will in flight of the craft automatically be disposed mostly as though resting on a horizontal floor. This is, of course, of particular advantage in this type of aircraft which may take off, land or hover vertically and in forward flight is in different tilted dispositions, yet the pilot and passenger or passengers will in each event have that optimum rest comfort on the seats for which they were designed on a horizontal support. The seat arrangement in this fashion will also relieve particularly a passenger or passengers of the startling sensation, alarming to some, of his or her seat tipping with the craft.

What is claimed is:

1. In a vertical take-off aircraft with a vertical axis, the combination with a disc-like top wing about said axis having a concentric ring-like through-duct dividing said wing into inner and outer sections with top and bottom lift surfaces, spinner members power-driven about said axis and having air impeller blades projecting into and operating in said wing duct, a fuselage suspended from and fixedly connected with said inner wing section, and a manual control for causing the flying craft to tilt with its axis into and from vertical disposition, with the craft responding in flight in normal forward direction to tilting of said axis from vertical disposition, of an automatic tilt control for the flying craft comprising a baffle pivotally mounted on the wing about an axis normal to said forward direction for swinging movement to and from superposition on a part of one of said lift surfaces, with said baffle being shaped to be in substantial form-fit with said surface part when in superposition thereon to then serve as part of said one lift surface, and mechanism acting on said tilting of the craft axis into and from vertical disposition to swing said baffle into and from superposition on said surface part, respectively, with said baffle reacting with the passing air in forward flight of the craft increasingly to counter the manually controlled tilt of the craft as the baffle swings farther away from said surface part.

2. The combination in a vertical take-off aircraft as in claim 1, in which said mechanism is in the form of a pendulous weight carried by the craft and gravity-held in vertical disposition, and an operating linkage between said weight and baffle.

3. The combination in a vertical take-off aircraft as in claim 1, in which said baffle is pivotally mounted on said wing near said wing duct for swinging movement into and from superposition on a part of the top surface of said inner wing section which with reference to said forward direction is behind said pivot axis.

4. The combination in a vertical take-off aircraft as in claim 1, in which the top surface of said inner wing section above said wing duct is dome-shaped of which a part facing in said forward direction is said surface part and said baffle is a hood pivoted on said wing near said wing duct and is shaped to be in substantial form-fit with said surface part when in superposition thereon.

5. The combination in a vertical take-off aircraft as in claim 1, in which there is provided in said fuselage a passenger seat pivoted to the top of said fuselage about an axis parallel to the pivot axis of said baffle so as to act as a pendulous weight gravity-held in vertical disposition, and said mechanism is in the form of said seat, and an operating linkage between said seat and baffle.

6. The combination in a vertical take-off aircraft as in claim 5, in which a plurality of pilot and passenger seats are top-pivoted in said fuselage jointly to act as a pendulous weight gravity-held in vertical disposition, and said mechanism is in the form of said seats, and an operating linkage between said seats and baffle.

7. The combination in a vertical take-off aircraft as in claim 1, in which the top surface of said inner wing section above said wing duct is dome-shaped of which a part facing in said forward direction is said surface part, and said baffle is a hood pivoted on said wing near said wing duct and is shaped to be in substantial form-fit with said surface part when in superposition thereon, and there is provided in said fuselage a passenger seat pivoted on top about an axis parallel to the pivot axis of said hood so as to act as a pendulous weight gravity-held in vertical disposition, and said mechanism is in the form of said seat, and an operating linkage between said seat and hood.

8. The combination in a vertical take-off aircraft as in claim 7, in which a plurality of pilot and passenger seats are top-pivoted in said fuselage jointly to act as a pendulous weight gravity-held in vertical disposition, and said mechanism is in the form of said seats, and an operating linkage between said seats and hood.

References Cited

UNITED STATES PATENTS

| | | | |
|---|---|---|---|
| 2,454,598 | 11/1948 | Doyle | 46—76 |
| 2,936,972 | 5/1960 | Zinavage | 244—23 |
| 2,978,206 | 4/1961 | Johnson | 244—23 |
| 3,096,044 | 7/1963 | Gould | 244—12 |

FERGUS S. MIDDLETON, *Primary Examiner.*

T. W. BUCKMAN, *Assistant Examiner.*

U.S. Cl. X.R.

244—80